(12) United States Patent
Fernihough et al.

(10) Patent No.: US 6,265,022 B1
(45) Date of Patent: Jul. 24, 2001

(54) PROCESS OF PLUGGING COOLING HOLES OF A GAS TURBINE COMPONENT

(75) Inventors: John Fernihough, Ennetbaden (CH); Alexander Beeck, Küssaberg (DE); Andreas Bögli, Wettingen (CH)

(73) Assignee: ABB Alstom Power (Schweiz) AG, Baden (CH)

( * ) Notice: Subject to any disclaimer, the term of this patent is extended or adjusted under 35 U.S.C. 154(b) by 0 days.

(21) Appl. No.: 09/617,107

(22) Filed: Jul. 14, 2000

(30) Foreign Application Priority Data

Aug. 9, 1999 (EP) .................................................. 99810715

(51) Int. Cl.[7] ........................................................ B05D 1/32
(52) U.S. Cl. ........................ 427/142; 427/272; 427/282; 427/287; 29/889.1; 29/889.721; 29/889.722
(58) Field of Search ...................... 427/142, 282, 427/272, 287; 29/889.1, 889.721, 889.722

(56) References Cited

U.S. PATENT DOCUMENTS

| 4,402,992 | 9/1983 | Liebert . | |
|---|---|---|---|
| 4,743,462 | * 5/1988 | Radzavich et al. | 427/282 |
| 5,902,647 | 5/1999 | Venkataramani et al. . | |
| 6,004,620 | * 12/1999 | Camm | 427/142 |

FOREIGN PATENT DOCUMENTS

| 0843026A1 | 5/1998 | (EP) . |
|---|---|---|
| WO99/23273 | 5/1999 | (WO) . |

* cited by examiner

Primary Examiner—Katherine A. Bareford
(74) Attorney, Agent, or Firm—Burns, Doane, Swecker & Mathis, L.L.P.

(57) ABSTRACT

Process of plugging cooling holes (4) of a gas turbine component (1) with an external surface (7), having a cavity (2) and a plurality of cooling holes (4) before coating the gas turbine component (4), characterised in that mask material (6) is applied to the external surface (7) of the component (1) while a fluid is forced through the cooling holes (4), the mask material (6) is thickened while the fluid is forced through the cooling holes (4), the cooling holes (4) are plugged with plug material (6b), the mask material (6a) is removed from the external surface (7) of the component (1), the component (1) and the plugged cooling holes (4) are coated and the plug material (6b) is removed from the cooling holes (4).

19 Claims, 4 Drawing Sheets

PROCESS OF PLUGGING COOLING HOLES OF A GAS TURBINE COMPONENT

This application claims priority under 35 U.S.C. §§119 and/or 365 to Appln. No. 99 810 715.5 filed in Europe on Aug. 9, 1999; the entire content of which is hereby incorporated by reference.

FIELD OF INVENTION

The invention relates to a process of plugging cooling holes of a gas turbine component.

BACKGROUND OF THE INVENTION

Components such as gas turbine blades, vanes and other cooled parts often contain cavities that distribute cooling air to a plurality of holes in the wall of the part which lead to the outer surface. Most turbine components are coated for protection from oxidation and/or corrosion with, for example, an MCrAlY coating (base coat) and some are also coated with a thermal barrier coating (TBC) for thermal insulation. The demands of operation of the parts in a gas turbine often lead to the degradation of the coating before the structural integrity of the underlying part itself is degraded. Hence, the base coat and TBC must be removed and re-applied.

The re-application of the coatings can be very problematic for parts with a large number of cooling holes. Often the base coat can reach thicknesses of 150–300 μm, and the TBC may be another 200–500 μm in thickness. The combined thicknesses of these coatings would have a very significant (and negative) influence on the effectiveness of the cooling holes if the coatings were deposited into these holes, especially considering that some holes are 1 mm or less in diameter. Specially shaped cooling holes are particularly susceptible to this as their effectiveness depends heavily on the accuracy of the shape of the hole.

There have been several disclosures relating to this problem and there are several widely known practices. Those skilled in the art are aware that a common practice is to braze or weld the holes closed with a suitable material after the old coatings have been removed, re-apply the new coatings, and re-manufacture the holes. The problem with this is that the brazing or welding operations introduce zones of weakness into the material. Normal hole manufacturing operations have errors associated with the placement of the holes, and when residual welding or brazing material is left, the zones of weakness go into operation with the part and compromise the mechanical integrity of the part.

One disclosure which offers a solution to this is U.S. Pat. No. 5,702,288, in which an abrasive slurry is injected into the cavity of the component and forced through the cooling holes which were partially covered by the coating material. There was no welding or brazing closed prior to coating. However this also abrades the internal cooling configuration (ribs), any inserts, and also the non-coated portion of the cooing holes.

Another disclosure which offers a better solution is U.S. Pat. No. 4,743,462, in which fugitive plugs are inserted into the cooling holes and partially volatilize during the coating process. The volatilization disrupts the coating in the region of the hole, and once the plugs are completely removed the holes are essentially free of coating and the cooling air will be unimpeded. The disadvantage of this method is that the large portion of the plug which blocks the surface does not constitute an even continuation of the cooling hole (it is specified to be larger than the cooling hole opening), therefore the path of the cooling air will be different from the intention of the design. This is particularly true for film cooling holes and specially shaped holes which are highly dependent on the shape of the hole near the external surface of the part. If the walls of the cooling holes are not maintained straight all the way through the coating layers (again, MCrAlY and TBC may amount to 0.8 mm or more in thickness) the cooling efficiency will be significantly compromised.

A further disadvantage of the method disclosed in U.S. Pat. No. 4,743,462 is that the plugs must all be placed individually into the cooling holes. For small simple aero-engine parts such as the one illustrated in the disclosure (containing only several rows of cooling holes at the leading edge) this is feasible, however for large turbine components of land-based gas turbines which may contain several hundred cooling holes, it is no longer feasible to individually place plugs into each hole. This is further complicated by the fact that each component may be manufactured with several different types of cooling holes—including conical, straight cylindrical and holes with changing wall angles. Each type of cooling hole would require its own specially designed plug.

A further disclosure in which all holes are plugged at once is given in U.S. Pat. No. 5,800,695. A masking agent is placed into the cooling configuration and forced through until it fills the cooling holes from the inside, but only up to the level of the exterior surface of the component. A coating is then applied, in this case electrolytically applied platinum. Due to the non-conductivity of the plastic maskant cited in the disclosure, no Pt would be deposited on the masking agent in the cooling holes. However, if the coating were deposited using thermal spraying techniques, it would coat over the maskant in the cooling holes, forming a layer that would remain after maskant removal. This layer would have to be removed. No solution is offered for this problem—in particular, how to remove the layer of coating material in such a way that the intended cooling hole design is maintained through the thickness of the coating material.

In addition, only plastic materials are specified as maskant materials, and in U.S. Pat. No. 4,743,462 the mask material is specified to volatilize at a temperature below that of the deposition process. The problem with this is that part requiring a MCrAlY coating and TBC must have the MCrAlY coating "diffusion bonded" by a high temperature heat treatment (about 1000° C.–1150° C. in vacuum) before the TBC can be applied. These specified materials would not be retained for the TBC coating process, and would either have to be re-applied, or the advantage of the masking would be lost. Indeed, in patent U.S. Pat. No. 5,800,695 the example process clearly states that after electrolytic platinum coating, the maskant is removed and then the parts are aluminized, with no mention of protecting the cooling holes from Al deposition.

SUMMARY OF THE INVENTION

It is an object of the present invention to find a process of plugging all cooling holes of component at once, with the mask defining the walls of the cooling holes beyond the external surface of the component so that the deposited coating material forms the intended shape of the cooling hole. According to the invention a process was found for plugging cooling holes of a gas turbine component with an external surface, comprising a cavity and a plurality of cooling holes before coating the gas turbine component, characterised in that mask material is applied to the external surface of the component while a fluid is forced through the cooling holes, the mask material is thickened while the fluid is forced through the cooling holes, the cooling holes are plugged with plug material, the mask material is removed from the external surface of the component, the component and the plugged cooling holes are coated and the plug material is removed from the cooling holes. One important improvement of the present invention over the prior art is that the cooling holes are re-formed during the coating deposition processes to their originally intended design, even through the thickness of the applied coating. This can be further improved by forcing a fluid containing abrasive particles through the cooling holes, after the exposing of the masking of the external surface to the energy source and before plugging the cooling holes.

Many different energy sources, different mask materials and plug materials may be used for the process of the invention. The plug material may with advantageously contain particles of solid material so that after thickening and with the proper heat treatment to volatilize part of the plug material, a porous solid form is left which can withstand the high temperatures of the diffusion heat treatment necessary for the bonding between base material of the component and the MCrAlY coating, before applying the thermal barrier coating TBC. Another advantages is achieved when an insert is placed into the cavity of the component to avoid liquid mask material entering into the cavity and thickening there.

BRIEF DESCRIPTION OF THE DRAWINGS

Preferred embodiments of the invention are illustrated in the accompanying drawings, in which.

The drawings show only the parts important for the invention. Same elements will be numbered in the same ways in different drawings.

DETAILED DESCRIPTION OF THE INVENTION

Figure 1:
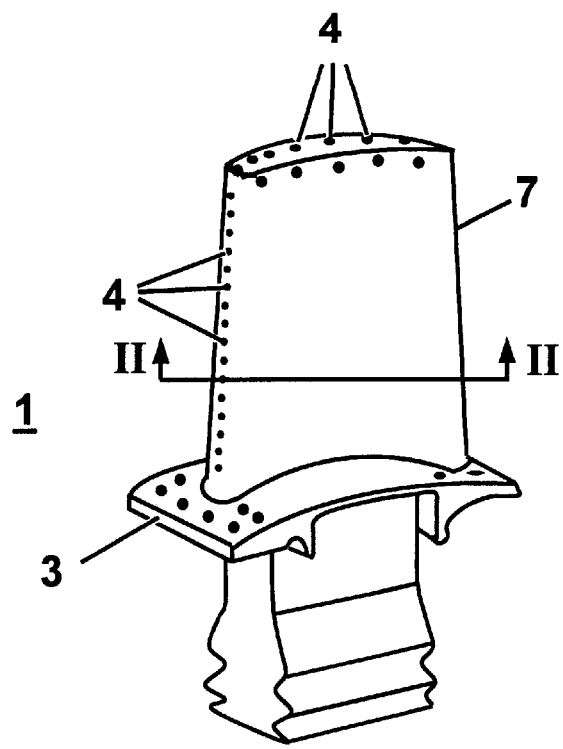
FIG. 1 is a perspective view of a gas turbine blade with cooling configuration according to the present invention.

FIG. 1 shows a component 1 such as a blade or vane of a gas turbine engine comprising a cavity 2, not visible in FIG. 1, a platform 3 and cooling holes 4, which are on the external surface 7 of the component 1 as well as on the platform 3 of the component 1. The present invention relates to a process of masking cooling holes 4 in the component 1 before the deposition of coating material on the external surface 7 of the component 1 takes place.

Figure 2:
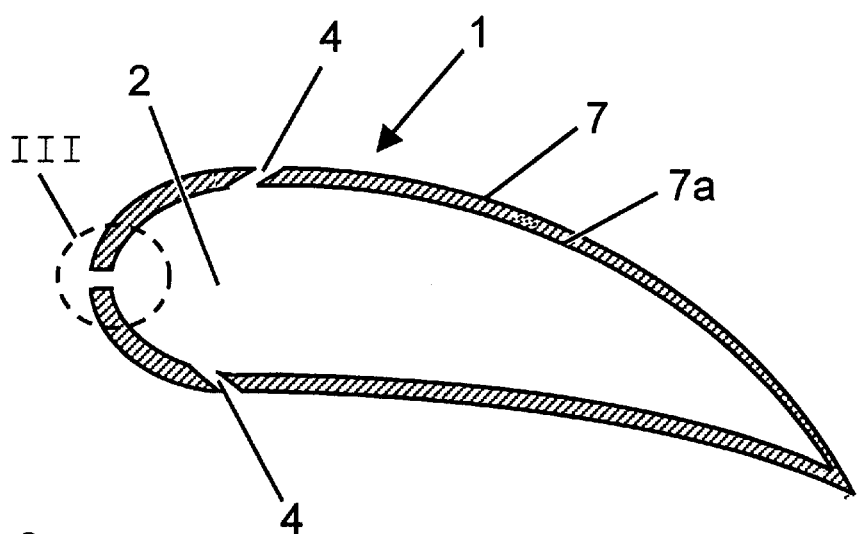
FIG. 2 is a cross-sectional view along line II—II of FIG. 1.

FIG. 2 shows a cross section through the component 1 along line II—II in the FIG. 1. The component 1 comprising a cavity 2 and three cooling holes 4. The number of the cooling holes 4 is given only as an example and may vary on the purpose the component 1 is used for. The component 1 has an external surface 7 and an internal surface 7a.

It is possible to apply the process for the coating of a new component 1 as well as to a component 1 which has to be repaired after use. It that case an already coated component 1 will by any means (chemical stripping with HCl, waterjet, high speed machining, etc.) be stripped of the old coating to reveal the external surface 7 of the component 1. The external surface 7 of the component 1 and surfaces of the cooling holes 4 may be cleaned or otherwise prepared to receive the mask material.

The steps of the process of the invention are given in FIGS. 3a to 3h, which show a cooling hole 4 from the component 1 in detail as given as an example in the circle III in the FIG. 2.

Figure 3A:
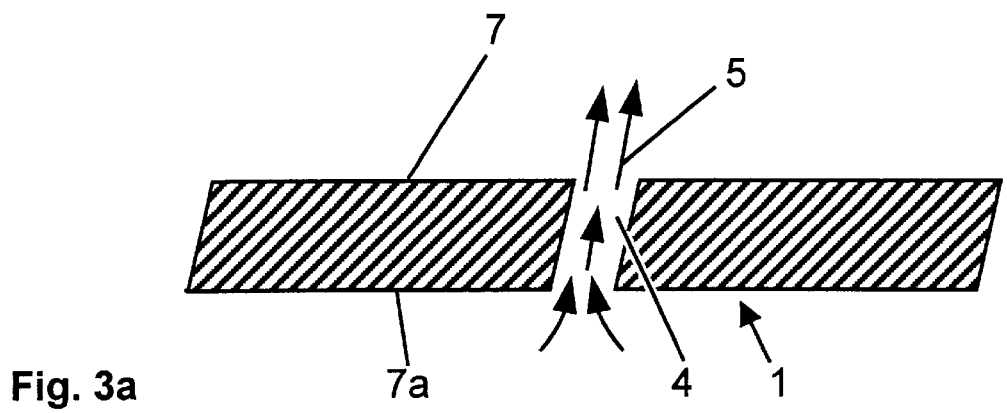
FIG. 3a illustrates a first step of a process according to the invention, at a cooling hole as enlarged in circle III in FIG. 2.
Figure 3B:
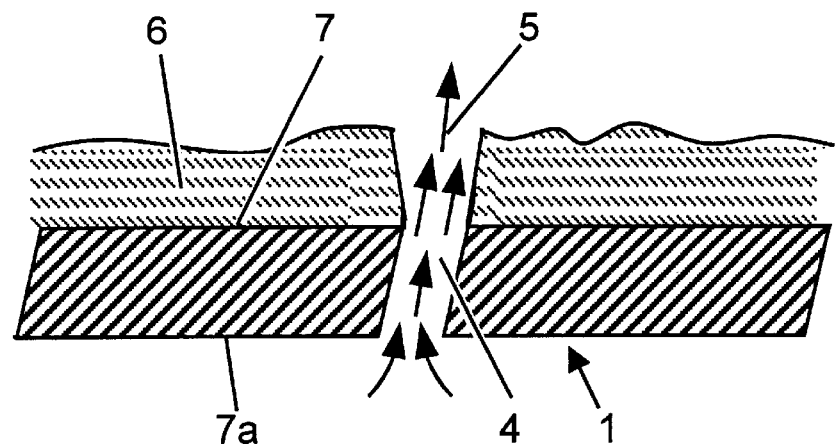
FIG. 3b illustrates a second step of a process according to the invention.

The FIG. 3a shows a first step of the process according to the invention. A flow 5 of a fluid such as air or water will be forced through the cooling hole 4. As seen in FIG. 3b, as a second step, the external surface 7 of the component 1, at the same time as the flow 5 is forced through the cooling holes 4, is masked with the mask material 6. The component 1 will be coated with, sprayed with, or immersed in a mask material 6 which is at least partially liquid, and which thickens, which means to become more viscous or solid when exposed to an energy source. The flow 5 impedes any mask material 6 from entering the cooling hole 4 and also defines the shape of the cooling hole 4 that the mask material 6 takes as it thickens on the external surface 7 of the component 1. This method causes the mask material 6 to define the shape of the cooling hole 4 above the external surface 7 to a shape very close to that originally intended.

This operation may be repeated several times until a desired thickness of the mask material 6 is achieved: the preferred range is that the mask thickness is at least the same thickness as the coating(s) to be applied, the most preferred range is a mask thickness of at least two to three times the thickness of the coating(s) to be applied.

As mask material 6 different substances may be used:
1. an organic material or
2. a resin of a plastic, such as polyurethane, a polyurethane oligomer mixture, poly(isobutyl methacrylate), poly(vinyl toluene), polypropylene or a polypropylene/polyurethane oligomer mixture, the class of vetones or silicones, or any photo-polymerizing resin or mix of resins,
3. the mask material 6 may also be a substance that is not at least partially liquid but rather a powder, which means a collection of solid particles. Thickening of the powder then refers to the agglomeration and the sticking together to form clumps or a large solid mass of individual powder particles. The powder would have to be sensitive to an energy source, which means that the powder particles agglomerate under the influence of the energy source or
4. a wax or a hydrocarbon, which is solid at room temperature.

Figure 3C:
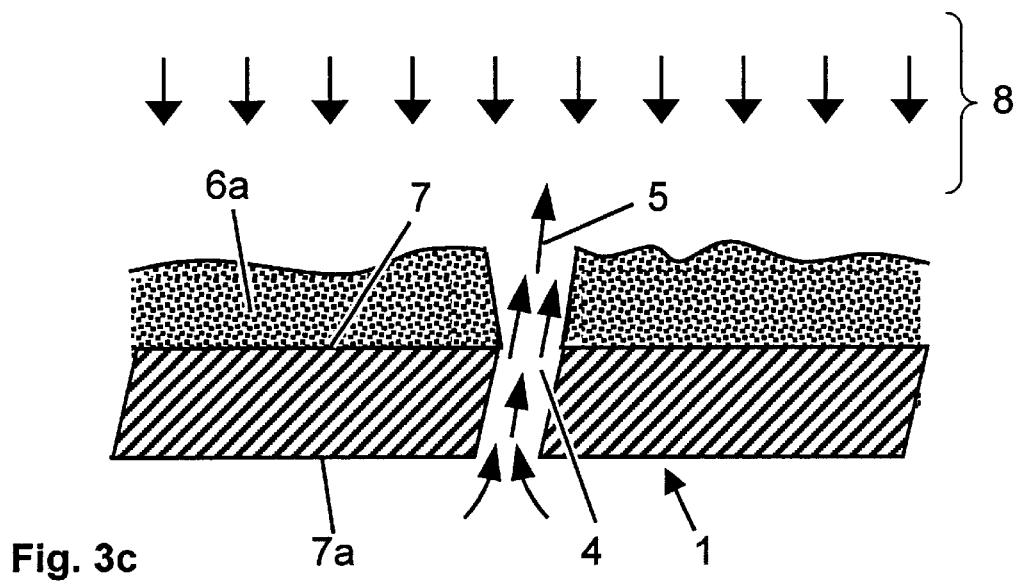
FIG. 3c illustrates third step of a process according to the invention, thickening

FIGS. 3c shows a third step of the process according to the invention. The desired energy source will be placed on the side of the external surface 7 so that the energy 8 impinges directly on said mask material 6 which thickens by that means. In the FIG. 3c the thickened mask material 6a is shown with different pattern. The mask material may also thicken without the use of an energy source (e.g. the wax which is solid at room temperature). In this case the freshly masked component need only be placed in an environment (or use a fluid) of such a temperature that the mask thickens as it changes temperature.

Different energy sources may be used in order to obtain the desirable result:
1. it can be electromagnetic such as visible light, ultraviolet light or infrared light,
2. it can be a device providing collimated light such as a laser,
3. the energy source can also be a device providing light of a single wavelength or a distribution of wavelengths centred around a desired wavelength with a narrow distribution band,
4. the energy source can be an infrared radiation or
5. the energy source can be sonic vibrations ranging from infrasonic (below 20 Hz) to ultrasonic (above 20,000 Hz) frequencies. Is this case the energy source can be a transducer (i.e. an ultrasonic transducer) or
6. the energy is microwave radiation.

Figure 3D:
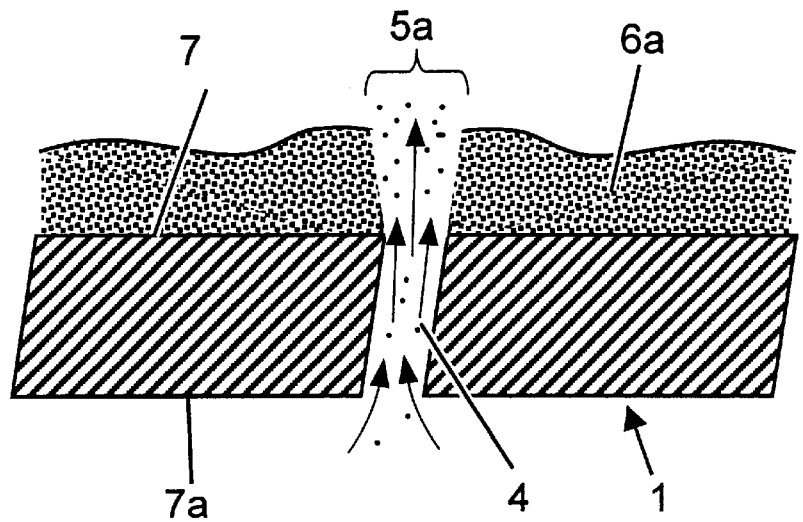
FIG. 3d illustrates an optional step of a process according to the invention.

One variation of this invention after the desired thickness of the thickened mask material 6a is achieved, a fluid 5a containing abrasive particles is forced through the cooling holes 4. This is shown in FIG. 3d. The abrasive particles will be hard enough to wear away the thickened mask material 6a but not the metallic part of the component 1 itself. This is to achieve more accurately (when this effect is needed) the originally intended shape of the cooling hole 4 through the coating(s) beyond the external surface 7 of the component 1.

Figure 3E:
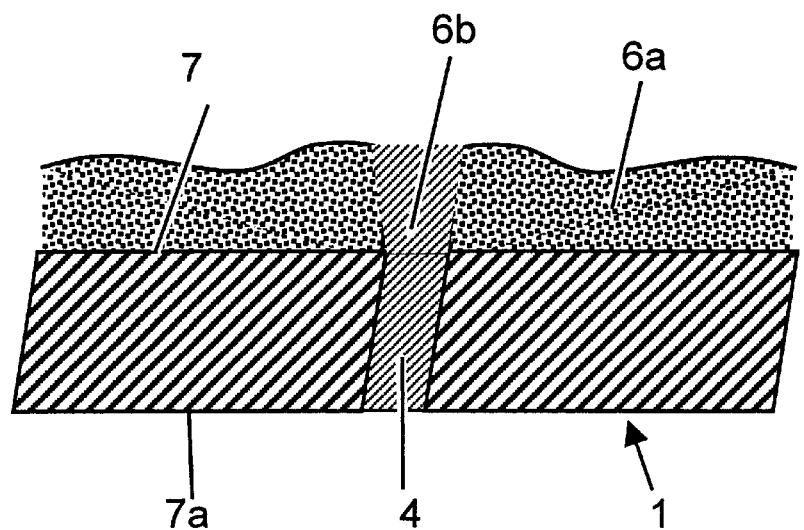
FIG. 3e illustrates fourth step of a process according to the invention.

FIGS. 3e shows the fourth step of the process according to the invention. Once the desired thickness of the thickened mask material 6a is achieved, the cooling hole 4 and the hole above the external surface 7 of the component 1 are filled with a plug material 6b which is sufficiently different from the thickened mask material 6a. After plugging the cooling holes 4 the thickened mask material 6a is removed while leaving the plug material 6b essentially in place. This is shown in FIG. 3e. As an example the plug material 6b could be a version on the mask material 6a containing a high density of metallic of ceramic particles.

In general, the plug material 6b could be
1. an organic material
2. a resin of a plastic, such as polyurethane, a polyurethane oligomer mixture, poly(isobutyl methacrylate), poly (vinyl toluene), polypropylene or a polypropylene/polyurethane oligomer mixture, the class of vetones or silicones, or any photo-polymerizing resin or mix of resins, in a variation of that it could contain particles of metal or oxide metals such as silica, magnesia, calcia, alumina, zirconia, yttria or mixture thereof, in an embodiment as described above the thickened plug material 6b containing the metal or oxide particles is heated so as to volatilise or otherwise remove the organic portion of the plug material before the coating(s) are deposited on the component 1 surface, it also may contain binding agents which are effective in holding together the solid particles of the metal or oxide particles after the organic portion of the plug material 6b is removed,
3. the plug material 6b may also be a substance that is not at least partially liquid but rather a powder, which means a collection of solid particles. Thickening of the powder then refers to the agglomeration and the sticking together to form clumps or a large solid mass of individual powder particles. The powder would have to be sensitive to an energy source, which means that the powder particles agglomerate under the influence of the energy source. The powder could be mixed with particles of metal or oxide material such as silica, magnesia, calcia, alumina, zirconia, yttria or mixture thereof or
4. the plug material 6b is a ceramic slurry or paste with essentially no polymerizing agent included.

Figure 3F:
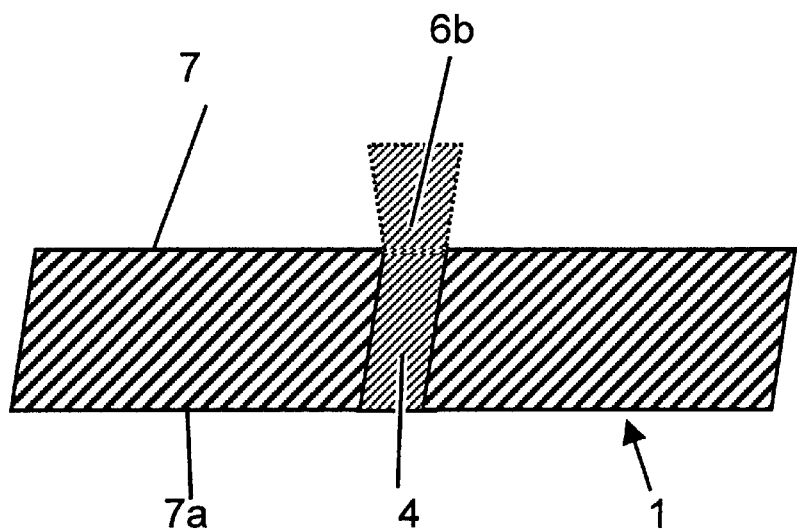
FIG. 3f illustrates a fifth step of a process according to the invention.
Figure 3G:
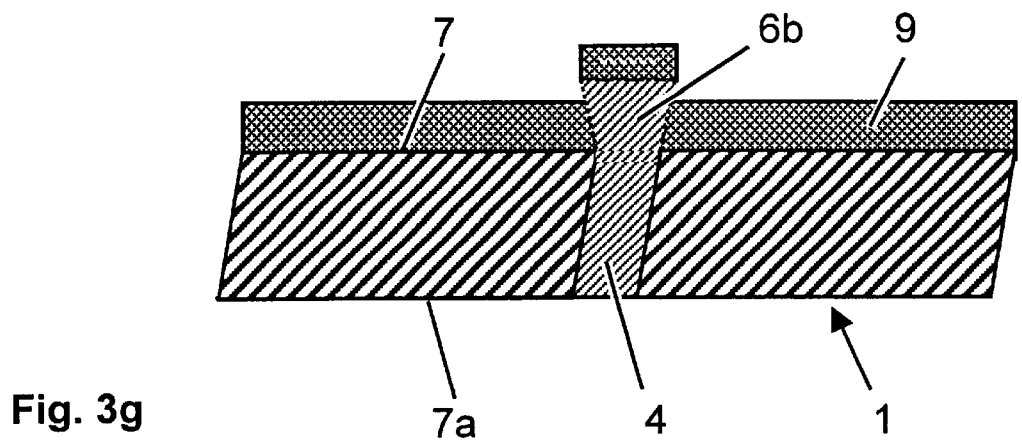
FIG. 3g illustrates a sixth step of a process according to the invention.

Once the plug material 6b is hardened the entire assembly could be heated to a temperature that would remove the mask material 6a and partially sinter the ceramic or metallic particles in the plug material 6b. The plug material 6b will extend into the cooling hole 4 of the component 1 so that the plugs will remain in place after the thickened mask material 6a is removed. This is shown in the FIG. 3g. After the mask material 6a is removed, the component 1 external surface 7 may be specially cleaned in preparation of the coating deposition. As seen in FIG. 3f the depositing of the coating 9 on the external surface 7 will take place directly on the masked cooling holes 4 with the means known in the state of the art. There may be more than one coating 9 depositions such as MCrAlY and TBC.

Figure 3H:
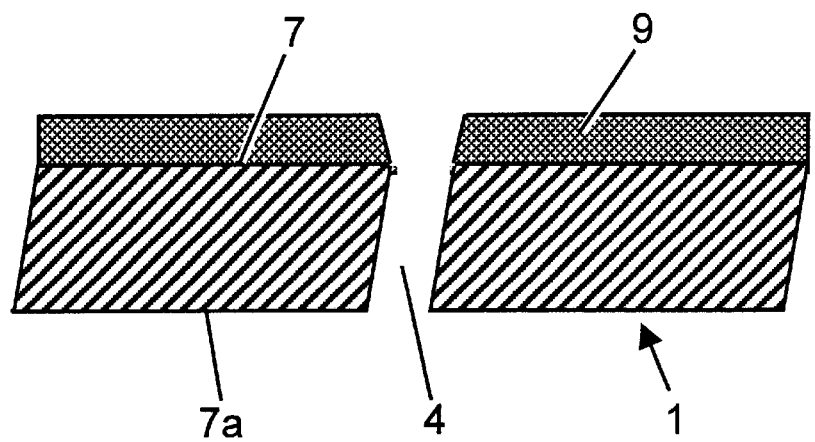
FIG. 3h illustrates seventh step of the process according to the invention, removing the plug material from the cooling hole

After the coating process(es) are completed, the plug material 6b will be removed to reveal cooling holes 4 essentially free of coating material 9 and with walls that run consistently through the newly deposited coating material 9. This is shown in FIG. 3h. This may be done by heating the components in a vacuum furnace at 600° C. for 2 hours. Residual ceramic may be removed by selective chemical cleaning, for example using KOH.

Figure 4:
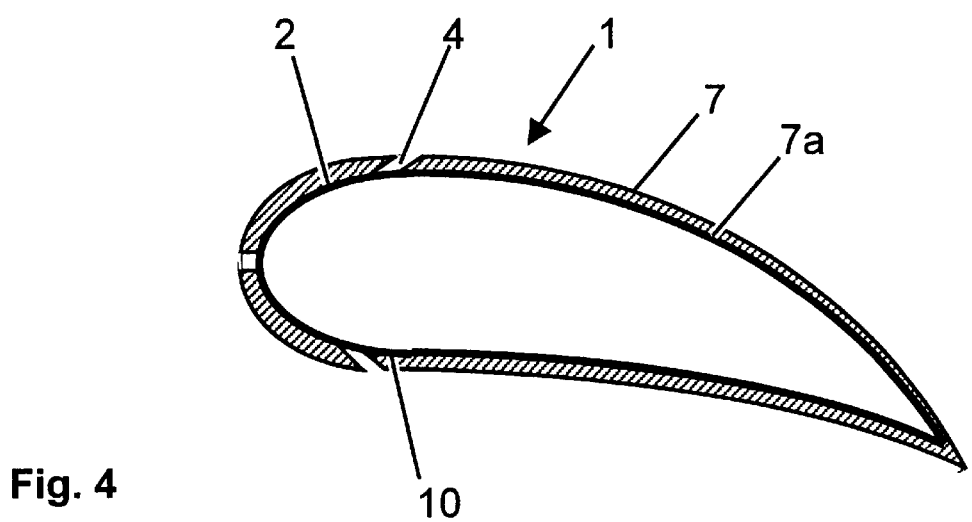
FIG. 4 is a cross section a view through a gas turbine blade with an insert within the cavity.

It might be an advantage to place an insert 10 to the internal surface 7a within the cavity 2 of the component 1 as shown in FIG. 4. The insert 10 is placed in the cavity 2 in order to avoid excess and unwanted plug material 6b from thickening in the cavity 2. The insert 10 may have a special coating which allows the easy withdrawal from the component cavity 2 once the plug material 6b has been thickened.

It is possible that the component 1 is heated or cooled before or during processing to facilitate the polymerising-process. For example, when wax is used as a mask material 6, the component may be dipped into a molten wax bath while blowing cooled air through the cooling configuration to cause the wax to thicken more quickly. In this case the entire component itself may be cooled before immersion into the wax bath in order to accelerate the thickening of the wax on the surface.

In an further embodiment an existing old coating is left on the component 1. In that case the cooling holes 4 are plugged and the old coating is removed by chemical etching after the plugs are in place. Then it is possible to coat the component 1 and remove the plugs as described above.

An important improvement of the present invention over the prior art is that the cooling holes 4 are reformed during the coating deposition processes very close to their originally intended design, even through the thickness of the applied coating 9.

While the present invention has been described by reference to the above-mentioned embodiments, certain modifications and variations will be evident to those of ordinary skill in the art. Therefore, the present invention is to be limited only by the scope and spirit of the appended claims.

What is claimed is:

1. Process of plugging cooling holes of a gas turbine component with an external surface, a cavity and a plurality of cooling holes, the process comprising:

applying a mask material to the external surface of the component while forcing a fluid through the cooling holes, thickening the applied mask material while forcing the fluid through the cooling holes, then plugging the cooling holes with plug material, then removing the mask material from the external surface of the component, then coating the component and the plugged cooling holes and then removing the plug material from the cooling holes.

2. Process of claim 1, further comprising forcing a fluid containing abrasive particles through the cooling holes, after the thickening of the mask material on the external surface and before the cooling holes are plugged.

3. Process of claim 1, wherein the mask material has a coated thickness that is at least equal to the thickness of a coating to be deposited on the external surface of the component.

4. Process of claim 3, wherein the mask material has a coated thickness of 200%–300% of the thickness of the coating to be deposited on the external surface of the component.

5. Process of claim 1, wherein the thickening of the mask material is done by means of an energy source.

6. Process of claim 1, wherein at least one of the mask and plug material is an organic material.

7. Process of claim 6, wherein at least one of the mask and plug material is a resin of a plastic, polyurethane, a polyurethane oligomer mixture, poly(isobutyl methacrylate), poly(vinyl toluene), polypropylene, a polypropylene/polyurethane oligomer mixture, a polymer of the class of vetones or silicones, a photo-polymerizing resin or mix of photo-polymerizing resins.

8. Process of claim 7, wherein the plug material contains particles of: metal or oxide material, silica, magnesia, calcia, alumina, zirconia, yttria or a mixture thereof.

9. Process of claim 8, wherein the plug material is heated so as to volatilize or otherwise remove the organic portion of the plug material before the coating is deposited on external surface the component.

10. Process of claim 9, wherein the plug material includes binding agents which are effective in holding together the solid particles of metal or oxide after the organic portion of the plug material is removed.

11. Process of claim 6, wherein the mask material is a wax or a hydrocarbon.

12. Process of claim 1, wherein at least one of the mask material and plug material is a powder.

13. Process of claim 1, wherein the plug material is a ceramic slurry or paste with essentially no polymerizing agent included.

14. Process of claim 1, further comprising placing an insert in the cavity of the component before plugging the cooling holes.

15. Process of claim 14, wherein the component is heated before or during any step of the process.

16. Process of claim 14, wherein the component is cooled before or during any step of the process.

17. Process of claim 14, wherein the temperature of the fluid which is forced through the cooling holes is controlled.

18. Process of claim 1, wherein an old coating is left during the masking process and plugging process and the old coating is removed from the component by chemical etching after the mask material is removed.

19. Process of claim 1, wherein an old coating is removed from the component before the step of applying the mask material.

* * * * *